United States Patent
Jeon et al.

(10) Patent No.: US 7,543,141 B2
(45) Date of Patent: Jun. 2, 2009

(54) METHOD AND APPARATUS FOR USER AUTHENTICATION USING INFRARED COMMUNICATION OF A MOBILE TERMINAL

(75) Inventors: Jae Sic Jeon, Seoul (KR); Eun Su Jung, Gwachun-si (KR)

(73) Assignee: SK Telecom Co., Ltd., Seoul (KR)

( * ) Notice: Subject to any disclaimer, the term of this patent is extended or adjusted under 35 U.S.C. 154(b) by 189 days.

(21) Appl. No.: 10/551,720

(22) PCT Filed: Mar. 31, 2004

(86) PCT No.: PCT/KR2004/000744

§ 371 (c)(1),
(2), (4) Date: Jan. 19, 2007

(87) PCT Pub. No.: WO2004/089029

PCT Pub. Date: Oct. 14, 2004

(65) Prior Publication Data

US 2008/0026727 A1    Jan. 31, 2008

(30) Foreign Application Priority Data

Apr. 2, 2003 (KR) .................... 10-2003-0020722

(51) Int. Cl.
*H04L 9/00* (2006.01)
*H04L 9/32* (2006.01)
*G06F 7/04* (2006.01)
*G06F 17/30* (2006.01)
*G06F 7/58* (2006.01)
*G06F 15/16* (2006.01)
*G06K 9/00* (2006.01)
*G06K 19/00* (2006.01)
*H03M 9/00* (2006.01)
*H04K 1/00* (2006.01)
*H04N 7/16* (2006.01)

(52) U.S. Cl. .............. 713/156; 713/157; 713/158; 713/155; 713/168; 713/171; 713/173; 713/175; 726/4; 726/27

(58) Field of Classification Search .................. 705/67; 726/9; 713/155, 156, 184, 185
See application file for complete search history.

(56) References Cited

U.S. PATENT DOCUMENTS

| | | | |
|---|---|---|---|
| 7,130,454 B1 * | 10/2006 | Berube et al. ............... 382/118 |
| 2003/0120925 A1 * | 6/2003 | Rose et al. ................... 713/176 |
| 2003/0236991 A1 * | 12/2003 | Letsinger ..................... 713/200 |
| 2004/0124966 A1 * | 7/2004 | Forrest ........................ 340/5.8 |

* cited by examiner

*Primary Examiner*—Shin-Hon Chen
(74) *Attorney, Agent, or Firm*—Lowe Hauptman Ham & Berner, LLP

(57) ABSTRACT

A method and apparatus for user authentication using infrared communication of a mobile terminal is disclosed. The user authentication system, which is for identifying a user who requests service from an automated machine, comprises a mobile terminal for transmitting electronic signature data for the user in the form of an infrared signal, automated information providing means for providing the requested service after verifying the validity of the electronic signature data, and certificate providing means for registering an authorization certificate in response to a request from the mobile terminal and transmitting the certificate to the automated information providing means for verifying the user authentication.

12 Claims, 4 Drawing Sheets

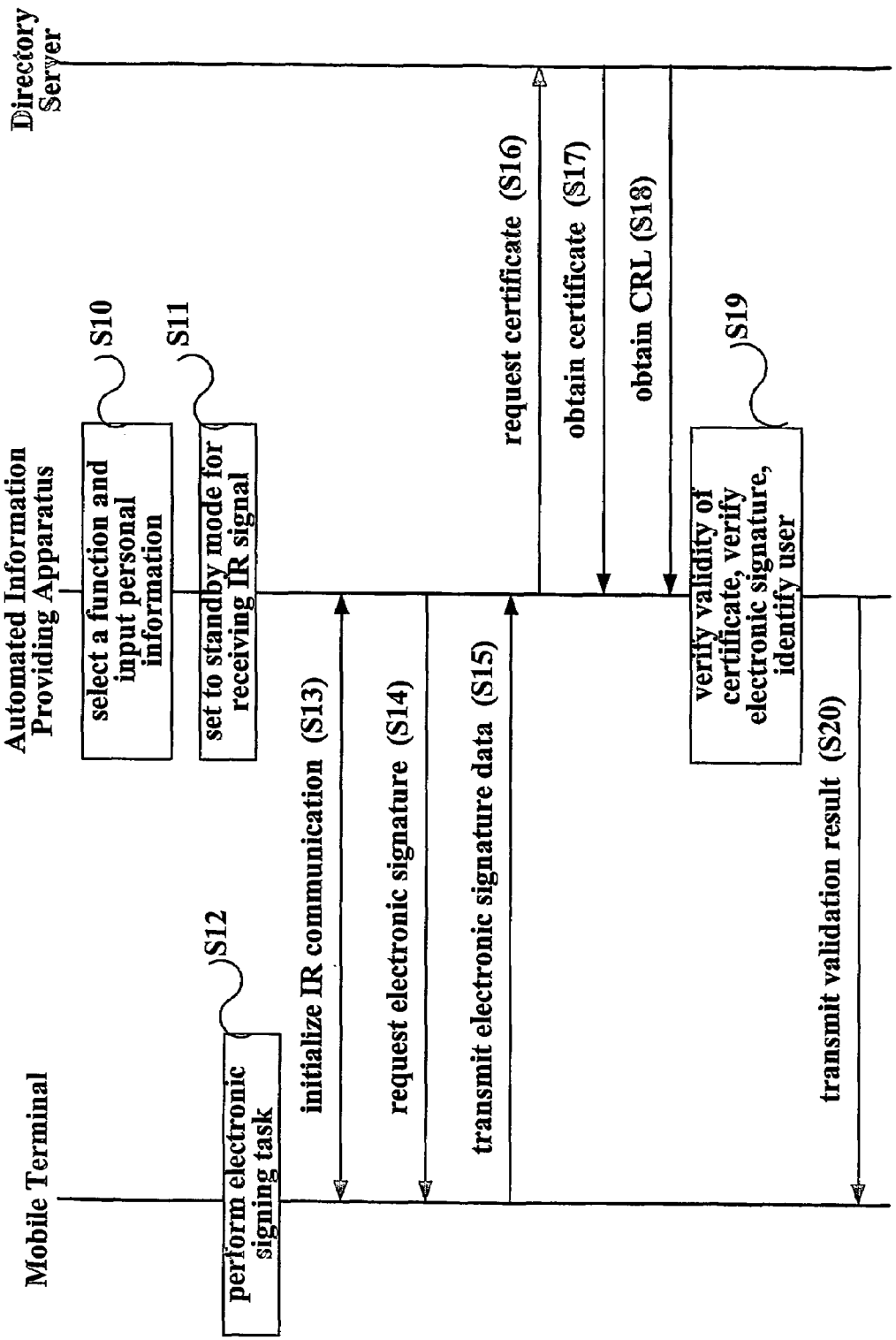

METHOD AND APPARATUS FOR USER AUTHENTICATION USING INFRARED COMMUNICATION OF A MOBILE TERMINAL

1. TECHNICAL FIELD

The present invention relates to a method and apparatus for user authentication using infrared communication of a mobile terminal, and more specifically, but not by way of limitation, to a method and apparatus for wireless user authentication using infrared communication of a mobile terminal

2. BACKGROUND ART

Automated transaction systems such as automatic banking machines or automated civil affair document issuing machines require user authentication so that only authorized users may access the systems. Every requested service such as deposit/withdrawal of cash or issuance of documents can be securely processed only after the authentication is done.

The user authentication may be performed in various manners. One of the most popular methods is that a user who requests service from an automated transaction system registers his/her own password at an institution to which the automated transaction system belongs and accesses the automated transaction system with the registered password.

Instead of the password, the fingerprint of a user may be utilized to identify the user. In this case, a fingerprint recognition apparatus installed in the automated transaction system performs the user authentication process by comparing an input fingerprint with pre-registered fingerprints.

In the user authentication method using passwords, wherein 4-digit passwords are commonly used, passwords that users can remember are notorious for being easy to determine by clever intruders or hackers. Thus, the password becomes the weakest link in the security chain and such an authentication method does not provide a high level of security.

In the user authentication method using fingerprints, a high degree of security can be ensured. However, the recognition rate of a fingerprint recognition apparatus may vary depending on the operating environment or the state of input fingerprints, which is a drawback to reliable user authentication.

3. DISCLOSURE OF INVENTION

In view of the shortcomings of the prior art, it is an object of the present invention to provide a system and method for user authentication using infrared communication of a mobile terminal in which electronic signature data stored in the mobile terminal is provided to an automated transaction system in a wireless manner so that the user may be identified.

It is another object of the present invention to provide a system and method for user authentication using infrared communication of a mobile terminal in which user authentication is performed by infrared communication between the mobile terminal and an automated transaction system to transmit electronic signature data stored in the mobile terminal.

A system for user authentication using infrared communication of a mobile terminal in accordance with the present invention comprises a mobile terminal for generating electronic signature data for a user who requests a particular service in the form of an infrared signal with a view to performing a step of user authentication, automated information providing means for verifying the electronic signature data provided by the mobile terminal and for allowing the requested service depending on the verification result, and certificate providing means for registering a certificate in response to a request for issuance of the certificate by the mobile terminal and for transmitting the certificate to the automated information providing means through a communication network with a view to verifying the validity of user authentication.

A method for user authentication using infrared communication of a mobile terminal in accordance with the present invention comprises the steps of a first step, conducted by a user of a mobile terminal, of making a request for a particular service by automated information providing means, a second step, responsive to a request for electronic signature data from the automated information providing means, of transmitting electronic signature data created by the mobile terminal to the automated information providing means by way of infrared communication, a third step, conducted by the automated information providing means, of obtaining a certificate registered by the mobile terminal from certificate providing means through a communication network, a fourth step, conducted by the automated information providing means, of performing user authentication by verifying the validity of the certificate and the electronic signature data, and a fifth step of allowing the requested service if the user authentication is successful.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

In the drawings:

FIG. 5 is a flowchart illustrating the method for user authentication in accordance with the present invention.

5. MODES FOR CARRYING OUT THE INVENTION

In order that the invention may be fully understood, preferred embodiments thereof will now be described with reference to the accompanying drawings.

Figure 1:
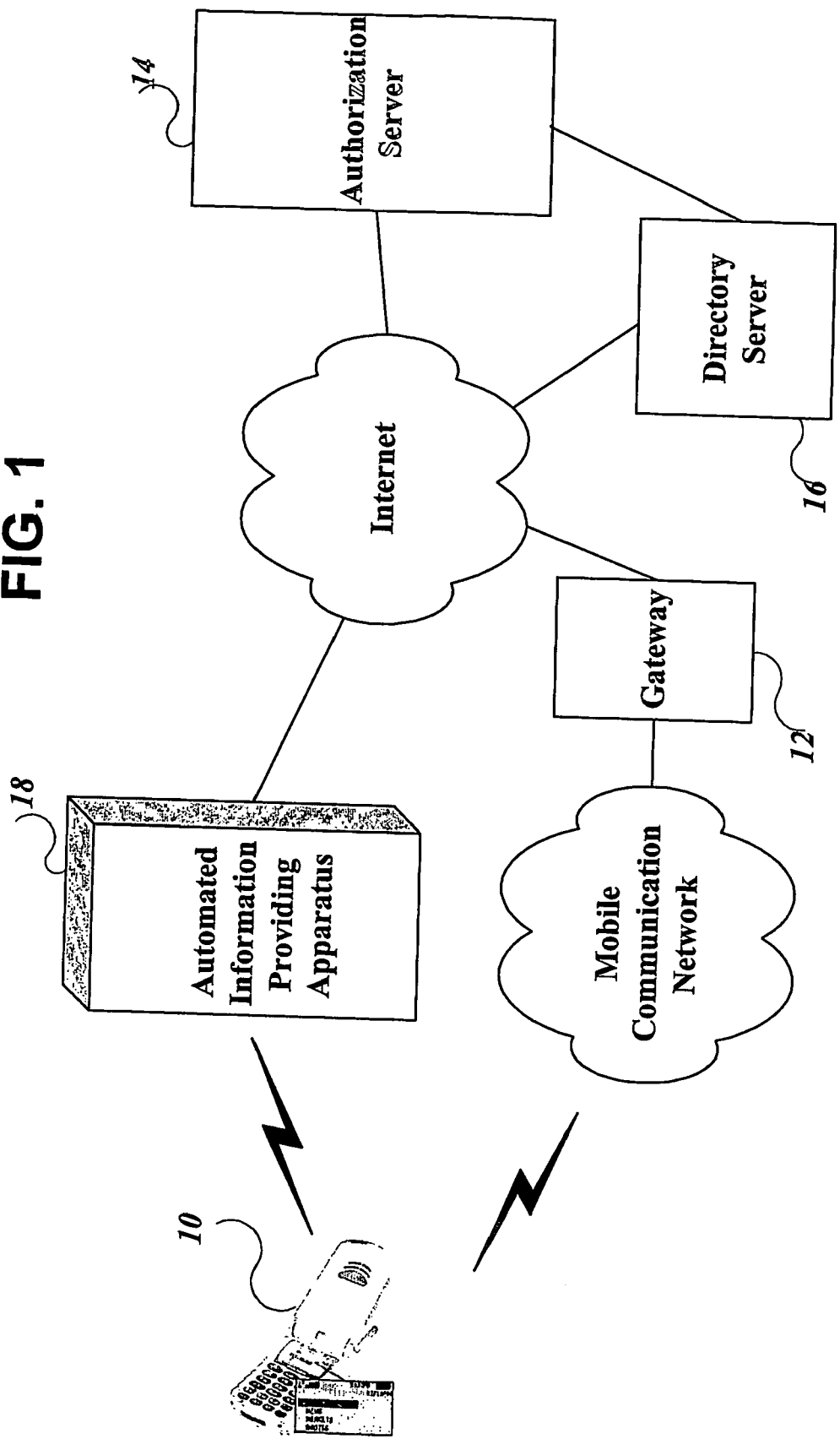
FIG. 1 illustrates a block diagram of a telecommunication network for embodying the user authentication system using infrared communication of a mobile terminal in accordance with the invention.

FIG. 1 illustrates a block diagram of a telecommunication network for embodying the user authentication system using infrared communication of a mobile terminal in accordance with the invention.

The user authentication system comprises a mobile terminal 10, a gateway 12, an authorization server 14, a directory server 16, and an automated information providing apparatus 18.

The mobile terminal 10, which serves voice and data communication through a mobile communication network, connects to the authorization server 14 through the mobile communication network and the Internet, generates a pair of a private key and a public key based on a public key infrastructure (PKI), receives an authorization certificate and electronic signature data based on the authorization certificate from the authorization server 14.

The mobile terminal 10 transmits the electronic signature data generated by the authorization server 14 to the automated information providing apparatus 18 through an infrared communication channel so that the authentication of the mobile terminal user may be performed. If the user authentication is successful, the user can get services from the automated information providing apparatus 18.

Figure 2:
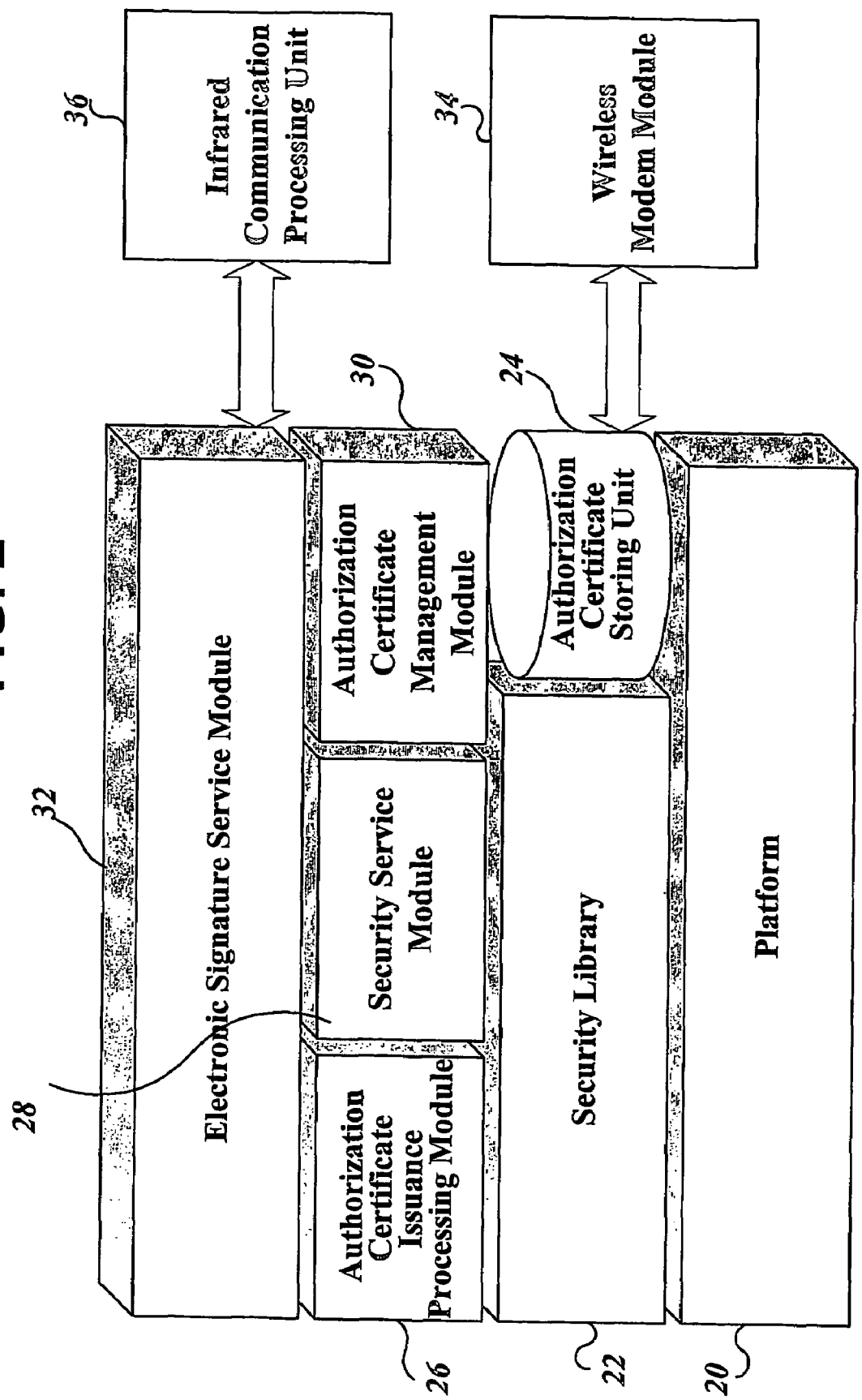
FIG. 2 illustrates the application structure for electronic signature of the mobile terminal shown in FIG. 1.

As shown in FIG. 2, the mobile terminal 10 includes applications such as a security library 22, an authorization certificate storing unit 24, an authorization certificate issuance processing module 26, a security service module 28, an authorization certificate management module 30, and an electronic signature service module 32 on a platform 20 and also includes a wireless modem module 34 for bidirectional wireless communication with the wireless communication network through uplink and downlink and an infrared communication processing unit 36.

The security library 22 of the mobile terminal 10 provides information required for processing of security service with being linked to a security service program. The authorization certificate storing unit 24 stores certificate data for the mobile terminal user provided from the authorization server 14.

The authorization certificate issuance processing module 26 performs a task for letting the authorization server 14 issuing an authorization certificate by generating a PKI-based cryptographic key pair including a private key and a public key. The security service module 28 performs a security service for processing of the authorization certificate issuance and for processing of the electronic signature. The authorization certificate management module 30 manages the authorization certificate received through the authorization certificate issuance processing module 26.

The electronic signature service module 32 performs an electronic signing service using the authorization certificate received from the authorization server 14 and the private key and transmits the electronic signature to the automated information providing apparatus 18 using the infrared communication. The electronic signature service module 32 also performs encryption/decryption of outgoing/incoming data.

In conjunction with the electronic signature service module unit 32, the infrared communication processing unit 36 converts the electronic signature data into an infrared signal and converts the infrared signal received from the automated information providing apparatus 18 into an electric signal.

The gateway 12 that exists between the mobile communication network and the Internet shown in FIG. 1 converts the communication signals from the mobile communication network into data packets according to the Internet protocol and converts the data packets from the Internet into a signal that can be received by the mobile terminal 10.

The authorization server 14 that connects to the mobile terminal 10 through the Internet and the mobile communication network issues the authorization certificate using the cryptographic pair of a private key and a public key generated by the mobile terminal 10 based on the PKI electronic signature and registers the authorization certificate at the directory server 16.

The directory server 16 stores the authorization certificate issued by the authorization server 14 and provides the authorization certificate in response to the request of the automated information providing apparatus 18 through the Internet.

The automated information providing apparatus 18 is for providing various services such as deposit/withdrawal of cash or issuance of documents without the aid of human operators.

The automated information providing apparatus 18 receives the electronic signature data from the mobile terminal 10 through the infrared communication channel and receives the authorization certificate of the mobile terminal 10, i.e., the URL of the certificate, from the authorization server 14. Then the automated information providing apparatus 18 examines the validity of the authorization certificate based on the latest CRL (certificate revocation list), verifies the validity of the electronic signature using the certificate, and performs the user certification using the information included in the certificate.

Figure 3:
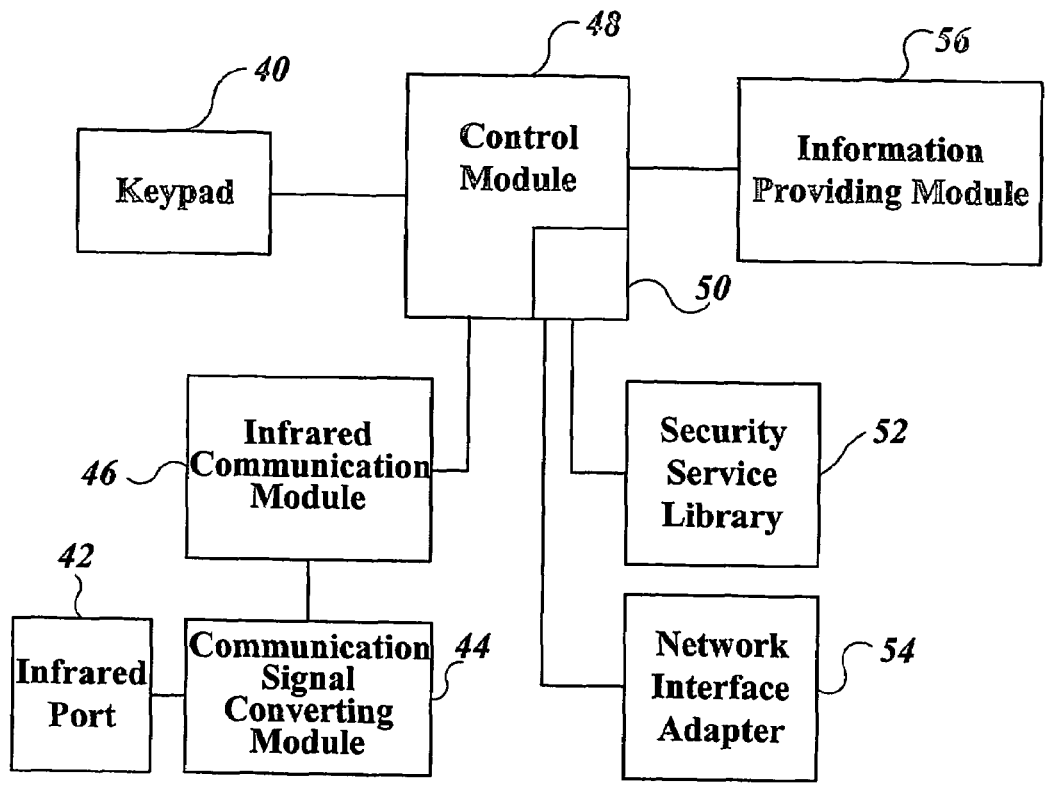
FIG. 3 illustrates a detailed block diagram of the automated information providing apparatus shown in FIG. 1.

As shown in FIG. 3, the automated information providing apparatus 18 includes a keypad 40, an infrared port 42, a communication signal converting module 44, an infrared communication module 46, a control module 48, a security service library 52, a network interface adapter 54, and an information providing module 56.

The keypad 40 of the automated information providing apparatus 18 contains a plurality of function keys for allowing authorized users to select a function. The infrared port 42, which is located in the front side of the automated information providing apparatus 18, performs infrared communication with the infrared port of the mobile terminal 10.

The communication signal converting module 44 converts the infrared signal received from the infrared port 42 into an electric signal that can be processed by the control module 48 and performs signal processing for transmitting the infrared signal from the infrared communication module 46 through the infrared port 42.

The infrared communication module 46 performs an initialization task required for the infrared communication between the infrared port 42 and the mobile terminal 10 and generates infrared signals to be transmitted to the mobile terminal 10.

Receiving a service request from the information providing module 56 through user key input, the control module 46 receives the authorization certificate from the authorization server 14 and examines the validity of the certificate based on the latest CRL (certificate revocation list) with a validation control program 50 executed. The control module 46, then, examines the validity of the electronic signature using the certificate, and performs the user certification using the information included in the certificate.

If the user certification for the mobile terminal 10 finishes successfully, the control module 46 activates the information providing module 56 so that the service requested by the mobile terminal user can be provided.

The security service library 52, in conjunction with the validation control program executed by the control module 48, provides information required for validation of the electronic signature. The network interface adaptor 54 connects to the authorization server 14 through the Internet and exchanges data for the certification of the mobile terminal user.

Activated by the control of the control module 48, the information providing module 56 provides various services such as deposit/withdrawal of cash or issuance of documents to the user.

Figure 4:
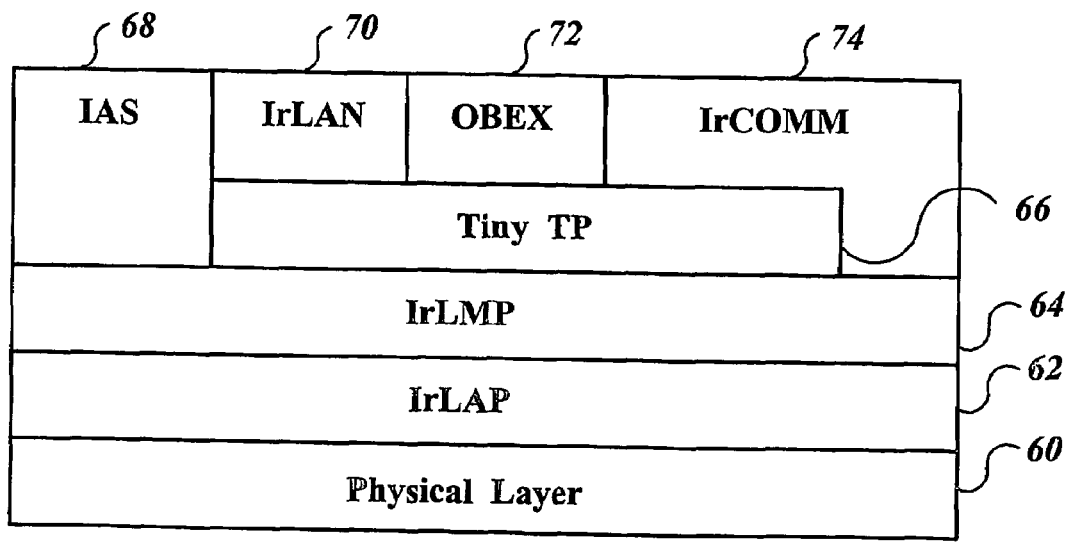
FIG. 4 illustrates the protocol for the infrared communication in accordance with the invention.

FIG. 4 illustrates the protocol for the infrared communication between the mobile terminal 10 and the automated information providing apparatus 18. The protocol comprises a physical layer 60, IrLAP (Ir Link Access Protocol) 62, IrLMP (Ir Link Management Protocol) 64, tiny TP 66, IAS (Information Access Service) 68, IrLAN (Ir Local Area Networks) 70, OBEX (Object Exchange Services) 72, and IrCOMM 74.

The IrLAP 62 is a protocol for providing a reliable connection between each device. The IrLMP 64 is a protocol for performing multiplexing with a view to providing multiple channels for the connection of the IrLAP 62. The tiny TP 66 is a protocol for flow control with the connection of the IrLMP 64. The IAS 68 is for providing the protocol and service for the IrLMP 64. The IrLAN 70 is a protocol that supports wireless connection of the infrared communication under LAN environment. The OBEX 72 provides an object exchange service similar to HTTP. The IrCOMM 74 is for controlling serial or parallel ports used in printers or modems.

The stack of the infrared protocol in accordance with the invention performs exchange of the electronic signature data for user certification between the mobile terminal 10 and the automated information providing apparatus 18 using the OBEX 72.

FIG. 5 is a flowchart illustrating a method and apparatus for user authentication in accordance with the present invention.

If the user of the mobile terminal 10 operates the keypad 40 of the automated information providing apparatus 18 to request a service (S10), the control module 48 of the automated information providing apparatus 48 sets the infrared communication module 46 to a standby mode for receiving an infrared signal (S11).

Based on the authorization certificate storing unit 24, the mobile terminal 10 performs an electronic signing task (S12). With the mobile terminal 10 placed opposite the infrared port 42 of the automated information providing apparatus 18, the mobile terminal 10 and the automated information providing apparatus 18 perform initialization of the infrared communication (S13).

The control module 48 of the automated information providing apparatus 18 transmits a message for requesting electronic signature data in the form of an infrared signal to the mobile terminal 10 through the infrared port 46 (S14). Receiving the request, the mobile terminal 10 activates the electronic signature service module 32 to transmit the electronic signature data in the form of an infrared signal through the infrared communication processing unit 36 (S15).

The control module 48 of the automated information providing apparatus 18 receives the electronic signature data from the mobile terminal 10 by activating the validation control program 50 and refers to the directory server 16 for the certificate for the user of the mobile terminal 10 through the network interface adaptor 54 (S16).

In response to the request, the directory server 16 provides the certificate for the mobile terminal user, which was issued and registered by the authorization server 14 (S17) and provides the latest CRL required for verifying the validity of the certificate (S18).

The control module 48 of the automated information providing apparatus 18 verifies the validity of the certificate based on the latest CRL, verifies the electronic signature data received from the mobile terminal 10, and performs user certification using the certificate (S19).

The automated information providing apparatus 18 transmits the result of the validation of the electronic signature to the mobile terminal 10 in the form of an infrared signal (S20) and activates the information providing module 56 so that the request of the mobile terminal user may be served.

The method and apparatus for user authentication using infrared communication of a mobile terminal in accordance with the invention enhances the certification security and integrity of electronic signature by using infrared communication, thereby providing more secured services when applied to various automated transaction machines.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

The invention claimed is:

1. A system for user authentication using infrared communication of a mobile terminal, comprising:

a mobile terminal configured to generate electronic signature data for a user who requests a particular service in the form of an infrared signal to perform a step of user authentication;

automated information providing means for verifying the electronic signature data provided by the mobile terminal and for allowing the requested service depending on the verification result; and certificate providing means for registering a certificate in response to a request for issuance of the certificate by the mobile terminal and for transmitting the certificate to the automated information providing means through a communication network to verify the validity of user authentication;

wherein the mobile terminal includes:

a certificate issuance processing module configured to generate a private and public key pair to allow the certificate providing means to issue the certificate; and a security service module for providing security service for issuance of the certificate and processing of the electronic signature data.

2. The system set forth in claim 1, wherein the mobile terminal possesses applications including a security library for providing information required for processing of security service with being linked to a security service program, a certificate storing unit for storing the certificate provided by the certificate providing means, a certificate management module for managing the issued certificate, and an electronic signature service module for performing an electronic signing and data encryption and decryption using the issued certificate.

3. The system set forth in claim 2, wherein the mobile terminal includes an infrared communication processing unit for transmitting/receiving an infrared signal for user authentication by transmitting the electronic signature data in the form of an infrared signal.

4. The system set forth in claim 1, wherein the automated information providing means comprises a keypad for receiving user input for requesting the particular service, an infrared communication unit for transmitting/receiving an infrared signal for user authentication by receiving the electronic signature data from the mobile terminal, a control module for controlling the progress of the particular service by verifying the validity of the electronic signature data from the mobile terminal using the certificate provided by the certificate providing means, a security library for providing information required for verification of the electronic signature data in conjunction with a validation control function of the control module, a network interface adaptor for exchanging data for user authentication by connecting to the certificate providing means through a communication network, and an information providing module for providing the requested service under the control of the control module.

5. The system set forth in claim 4, wherein the control module belonging to the automated information providing means receives the certificate and a certificate revocation list from the certificate providing means, verifies the validity of the certificate based on the certificate revocation list, and performs the verification of the electronic signature data and authentication of the user using the certificate.

6. The system set forth in claim 5, wherein the mobile terminal and the automated information providing means exchange the electronic signature data by way of OBEX (Object Exchange Services) included in a protocol stack for the infrared communication.

7. The system set forth in claim 1, wherein the mobile terminal and the automated information providing means exchange the electronic signature data by way of OBEX (Object Exchange Services) included in a protocol stack for the infrared communication.

8. A method for user authentication using infrared communication of a mobile terminal, comprising:
- a first step at which a mobile terminal generates a PKI-based cryptographic public and private key pair for allowing a certificate providing means to generate and transmit an authorization certificate to the mobile terminal;
- a second step at which the mobile terminal sends a request for a particular service to an automated information providing means;
- a third step, responsive to a request for electronic signature data from the automated information providing means, of transmitting electronic signature data created by the mobile terminal to the automated information providing means by way of infrared communication;
- a fourth step, conducted by the automated information providing means, of obtaining a certificate registered by the mobile terminal from certificate providing means through a communication network;
- a fifth step, conducted by the automated information providing means, of performing user authentication by verifying the validity of the certificate and the electronic signature data; and
- a sixth step of allowing the requested service if the user authentication is successful.

9. The method set forth in claim 8, wherein the third step comprises: a first substep at which an infrared receiving mode is started by the automated information providing means, and an electronic signing is performed by the mobile terminal; a second substep of initializing communication between the automated information providing means and the mobile terminal; a third substep, conducted by the automated information providing means, of requesting the electronic signature; and a fourth substep, conducted by the mobile terminal, of transmitting the electronic signature data in the form of an infrared signal.

10. The method set forth in claim 8, wherein the fourth step comprises the steps of:
- c1) referring to the certificate providing means for the certificate for the user of the mobile terminal through the communication network;
- c2) obtaining the certificate registered by the user of the mobile terminal; and
- c3) obtaining the certificate revocation list.

11. The method set forth in claim 10, wherein the fifth step comprises the steps of:
- d1) verifying the validity of the certificate based on the received certificate revocation list;
- d2) verifying the electronic signature data using the validated certificate; and
- d3) performing user authentication based on the user identification information included in the certificate.

12. The method set forth in claim 8, wherein the fifth step comprises the steps of:
- d1) verifying the validity of the certificate based on the received certificate revocation list;
- d2) verifying the electronic signature data using the validated certificate; and
- d3) performing user authentication based on the user identification information included in the certificate.

* * * * *